3,309,215
YELLOW COLORED CELLULOSIC ARTICLE AND METHOD OF COLORING THE SAME

Wilbur T. Brader, Jr., Swarthmore, Pa., and Edward B. Jaynes, Wilmington, Del., assignors, by mesne assignments, to FMC Corporation, San Jose, Calif., a corporation of Delaware
No Drawing. Filed July 3, 1963, Ser. No. 292,717
6 Claims. (Cl. 117—7)

This invention relates to a flexible, hydrophilic cellulosic article uniformly impregnated with a water-insoluble inorganic cadmium compound. More particularly, it relates to a flexible, hydrophilic cellulosic article having a clear, stable, yellow color and a method of preparing the same.

It is often desirable, for example, in the preparation of articles of manufacture for the purpose of commercial sale, to employ transparent wrapping material of various colors in order to create a more attractive display. The methods for providing stable and attractive colors, particularly various shades of yellow, for transparent material such as clear, regenerated cellulose sheets, are often difficult and expensive.

It is an object of the present invention to provide a clear, yellow colored flexible hydrophilic cellulosic article which is color-stable.

It is another object of this invention to provide a clear, yellow colored regenerated cellulose film which is color-stable.

It is a further object of this invention to provide a relatively simple procedure for coloring flexible hydrophilic cellulosic articles, particularly regenerated cellulose film, an attractive yellow.

These and other objects are accomplished in accordance with the present invention which comprises a flexible, hydrophilic cellulosic article uniformly impregnated with a water-insoluble inorganic cadmium compound.

The flexible cellulosic articles of this invention include, for example, fibrous and non-fibrous sheets, foils, films, pellicles, ribbons, mono-filament and multi-filament yarn, staple fiber, cord, and similar articles. Prime examples of the hydrophilic cellulosic materials are regenerated cellulose, cellulose ethers including carboxymethyl cellulose ethers including carboxymethyl cellulose, hydrophilic cellulose esters, cotton, paper, etc. The preferred form of this invention concerns clear, non-fibrous hydrophilic cellulosic sheets and films uniformly impregnated with cadmium sulfide.

The method of this invention comprises treating a flexible hydrophilic cellulosic article with a solution of about 0.1 to about 10% of an inorganic water-soluble cadmium salt, then treating the article with an insolubilizing reagent which will react with the water-soluble salt to form an insoluble cadmium compound. Water-soluble cadmium salts include, for example, cadmium bromide ($CdBr_2 \cdot 4H_2O$), cadmium nitrate ($Cd(NO_3)_2 \cdot 4H_2O$), cadmium sulfate ($CdSO_4 \cdot H_2O$), cadmium chloride ($CdCl_2$), etc. Insolubilizing reagents include, for example, potassium monosulfide ($K_2S \cdot 5H_2O$), barium tetrasulfide ($BaS_4 \cdot 2H_2O$), barium trisulfide ($BaS_3$), sodium sulfide ($Na_2S$), etc. Preferably, the cellulosic article is treated with a soluble cadmium salt in an aqueous solution, for example, cadmium chloride in a concentration of 0.1 to 10% in water. The insolubilizing reagent is also preferably an inorganic compound dissolved in water, for example, sodium sulfide ($Na_2S$) at a concentration of about 0.05 to about 2.0% and higher by weight in water.

The dried colored film contains about the same proportion of insoluble cadmium compound as the weight concentration of the soluble cadmium salt in the initial treating solution.

In a more preferred form of the invention, wet gel (never-dried since regeneration) regenerated cellulose film is first treated with an aqueous solution about 5% by weight cadmium chloride for about 15 seconds at 25° C. The excess solution is removed from the surface of the film and it is then treated in an aqueous solution of about 2% by weight of sodium sulfide for 15 seconds at 25° C. Thereafter, the film is thoroughly washed in water at room temperature and may then be plasticized or anchor treated for coating purposes. The film is dried under tension and may advantageously be cured in an oven at about 90° C. for up to about 5 minutes. This procedure results in a very clear, bright yellow film of regenerated cellulose.

The residence time in the initial treating bath and the temperature of said bath are not critical since the soluble ions readily penetrate the wet, hydrophilic cellulosic article. The concentration of the insolubilizing reagent above the optimum amount is not necessary but may be used. For example, concentrations above 2% sodium sulfide are unnecessary but not detrimental to the process. A dwell time for the hydrophilic cellulosic article in the insolubilizing bath should be at least 2 seconds to permit a complete reaction and development of a stable color in the cellulosic base.

The process of this invention produces an attractive bright yellow color in the cellulosic base material. The color was found to be very stable when a regenerated cellulose film containing cadmium sulfide and manufactured in accordance with the preferred embodiment of the invention was exposed to a 3% solution of sodium bicarbonate at room temperature. No color was noted in any of the solutions at room temperature. When the solutions were heated to 75° C. only a very faint color was observed in the 3% sodium bicarbonate solution.

The usual water-miscible plasticizers, including glycerol, are useful for the colored base film of this invention. Anchoring agents for coatings are conveniently incorporated in the plasticizing bath and include, for example, melamine-formaldehyde precondensates, urea-formaldehyde precondensates, polyalkylenimines, liquid epoxy resins, etc. Water-immiscible anchoring agents may be applied to the colored base sheet after drying.

Polymeric film-forming coatings which may be used for this invention include, for example, nitrocellulose, vinyl resin polymers and copolymers, copolymers of vinylidene chloride and at least one other monomer copolymerizable therewith, polyalkylenes including polyethylene and polypropylene, acrylic resins, etc. The coatings may be applied by hot melt extrusion or wet laid as lacquers or latexes, over the colored cellulosic base sheet.

Various changes and modifications may be made practicing the invention without departing from the spirit and scope thereof and therefore, the invention is not to be limited except as defined in the appended claims.

We claim:
1. A clear, non-fibrous regenerated cellulose sheet uniformly impregnated with cadmium sulfide.
2. The sheet of claim 1 having a film-forming polymer coating on the surface thereof.
3. A method of preparing a clear, flexible, hydrophilic cellulosic film having a stable, bright yellow color which comprises treating said film with a solution of a water-soluble, inorganic cadmium salt, and thereafter treating said film with a solution of an inorganic compound capable of reacting with the cadmium salt to produce an insoluble cadmium sulfide compound in situ.

4. A method of preparing a clear, flexible, hydrophilic cellulosic film having a stable, bright yellow color which comprises treating said film with an aqueous solution of from 0.1 to about 10% by weight of cadmium chloride, and thereafter treating said film with an aqueous solution of from about 0.05 to about 2% by weight of sodium sulfide for at least 2 seconds.

5. The method of claim 4 wherein the cellulosic film is a regenerated cellulose film.

6. A method of preparing a clear regenerated cellulose film having a stable, bright yellow color which comprises treating said film, in the wet gel state, with an aqueous solution of about 5% by weight of cadmium chloride, removing excess solution from the film, then immersing said film in an aqueous solution of about 2% by weight of sodium sulfide for a period of at least 2 seconds, washing the film, and curing the film under tension for at least several minutes at an elevated temperature.

References Cited by the Examiner

UNITED STATES PATENTS

| | | | |
|---|---|---|---|
| 2,033,976 | 3/1936 | Dreyfus | 117—33.5 X |
| 2,042,033 | 5/1936 | Witte | 117—33.5 X |
| 2,073,381 | 3/1937 | Sell | 117—33.5 X |
| 2,180,508 | 11/1939 | De Fraine et al. | 117—33.5 X |

FOREIGN PATENTS

| | | |
|---|---|---|
| 340,636 | 1/1931 | Great Britain. |
| 791,090 | 2/1958 | Great Britain. |

OTHER REFERENCES

Gregory: Uses and Applications of Chemicals and Related Materials, Reinhold, New York, 1939, page 132.

WILLIAM D. MARTIN, *Primary Examiner.*

H. W. MYLIUS, M. LUSIGNAN, *Assistant Examiners.*